United States Patent [19]
Gabryelczyk et al.

[11] Patent Number: 5,254,292
[45] Date of Patent: Oct. 19, 1993

[54] DEVICE FOR REGULATING AND REDUCING THE FLUCTUATIONS IN A POLYPHASIC FLOW, AND ITS USE

[75] Inventors: Daniel Gabryelczyk, Rueil Malmaison; Marcel Arnaudeau, Paris; Maurice Cessou, Saint Symphorien D'Ozon, all of France

[73] Assignee: Institut Francais du Petrole, Rueil Malmaison Cedex, France

[21] Appl. No.: 20,434

[22] Filed: Feb. 22, 1993

Related U.S. Application Data

[63] Continuation of Ser. No. 576,414, Sep. 30, 1991, filed as PCT/FR90/00085, Feb. 2, 1990, abandoned.

Foreign Application Priority Data

Feb. 2, 1989 [FR] France ................... 89 01332

[51] Int. Cl.⁵ ................................. B01F 3/04
[52] U.S. Cl. ........................ 261/76; 261/DIG. 75; 166/267
[58] Field of Search ......... 417/430; 261/76, DIG. 75; 166/267

[56] References Cited

U.S. PATENT DOCUMENTS

| 543,410 | 7/1895 | Taylor | 261/DIG. 75 |
|---|---|---|---|
| 3,071,189 | 1/1963 | Colvin et al. | 166/267 |
| 4,705,114 | 11/1987 | Schroeder et al. | 166/267 |
| 4,830,584 | 5/1989 | Mohn | 417/430 |
| 5,035,842 | 7/1991 | Mohn | 261/DIG. 75 |

FOREIGN PATENT DOCUMENTS

| 8810901 | 12/1988 | Fed. Rep. of Germany | 261/76 |
|---|---|---|---|
| 2000688 | 1/1979 | United Kingdom | 261/76 |

Primary Examiner—Tim Miles
Attorney, Agent, or Firm—Antonelli, Terry, Stout & Kraus

[57] ABSTRACT

Device, in particular for regulating and reducing the fluctuations in the composition of a polyphasic flow including at least one liquid phase and one gaseous phase. This device comprises a container for separating said phases and at least one admission opening for the polyphasic mixture, as well as means for extracting the content of the container. The extraction means (3, 7, 40, 41) extend into said container (2, 39, 56) in such a manner that during normal operation, they extend through the liquid-gas interface (6). Said extraction means include extraction openings (4, 16, 19, 50, 51) arranged on both sides of the interface in normal operation; the sum of the throughflow sections of said openings, estimated from a reference position on at least a portion of a vertical axis, varies as a function of the slope, considered on said axis and for said portion, said portion extending during normal operation on both sides of said interface.

16 Claims, 5 Drawing Sheets

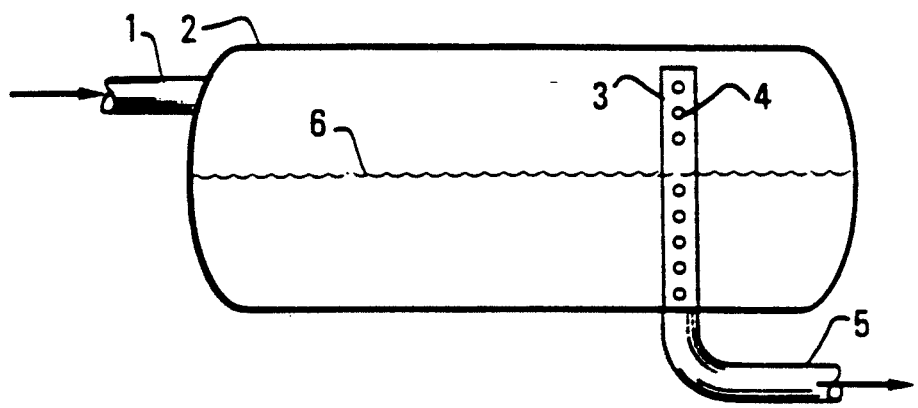
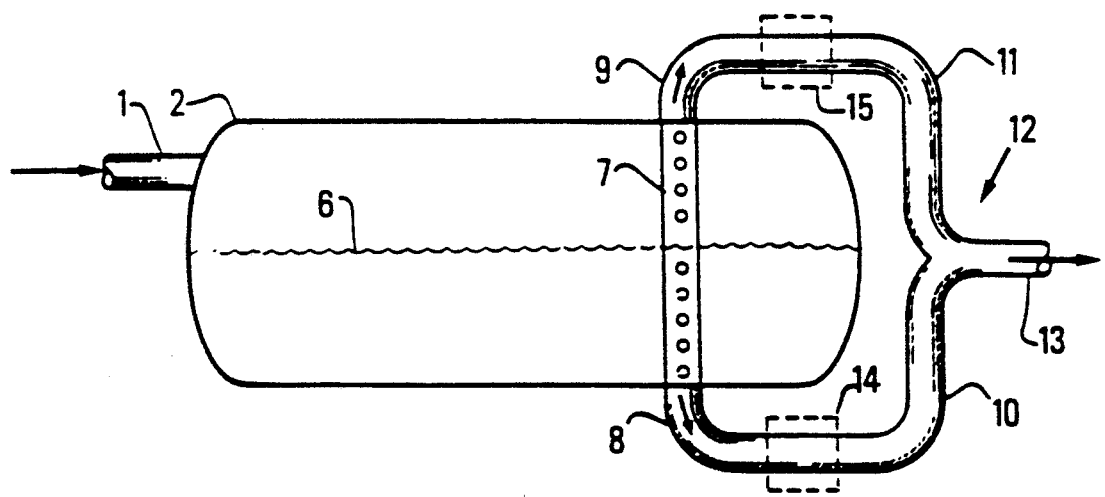
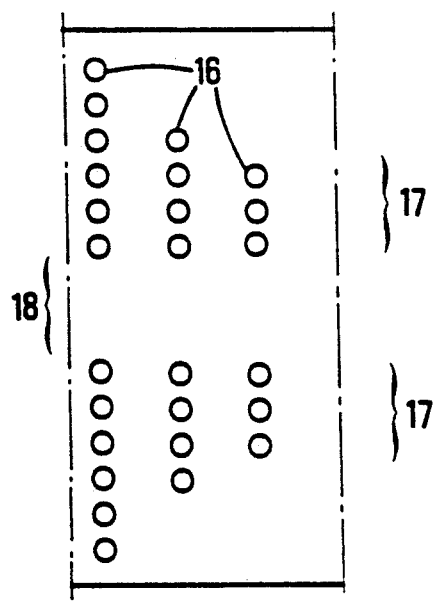
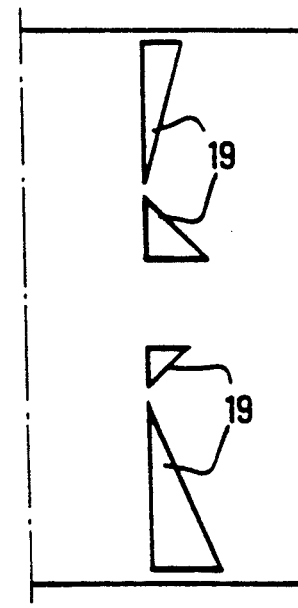

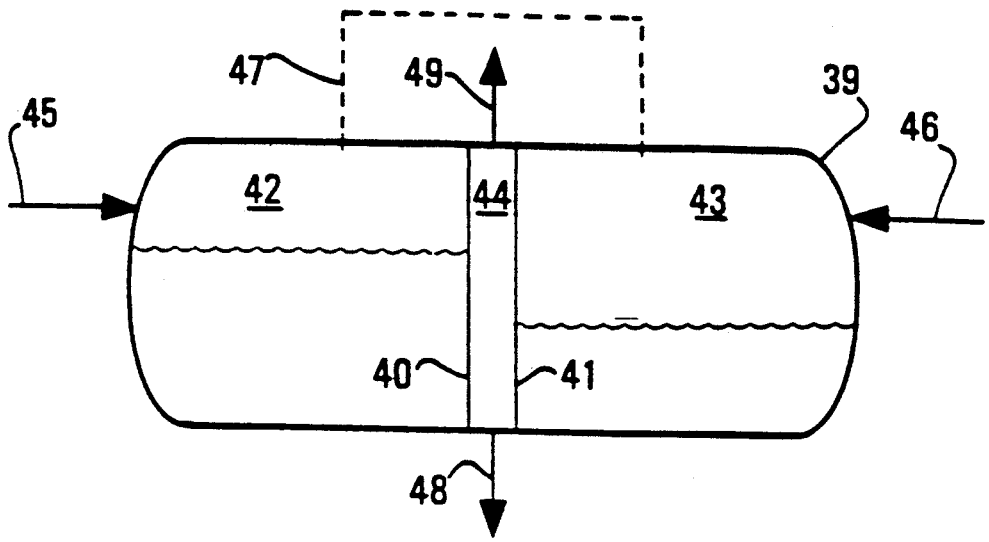
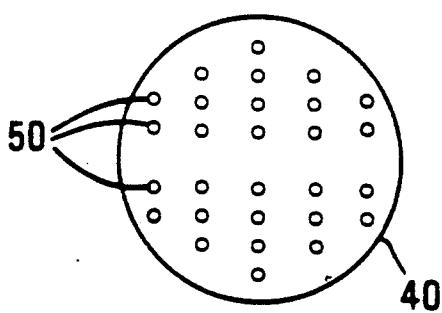
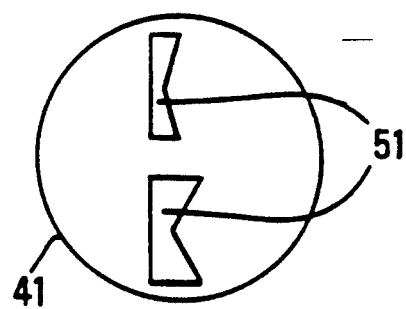

DEVICE FOR REGULATING AND REDUCING THE FLUCTUATIONS IN A POLYPHASIC FLOW, AND ITS USE

This application is a continuation application of application Ser. No. 576,414, filed Sep. 30, 1991, filed as PCT/FR90/00085, Feb. 2, 1990, now abandoned.

The present invention relates to a device for regulating and reducing the fluctuations in the composition of a polyphasic flow.

According to the prior art, it is necessary to use proportionally adjusted valve systems, accurate detectors, and control means for the valve systems to achieve the regulation and reduction of fluctuations referred to above.

However, such elements are expensive and fragile. They adapt poorly to harsh operating conditions such as those found on the ocean floor, particularly during operation of offshore oil wells.

The present invention proposes a simple, sturdy system that does not require the use of a proportionally adjusted valve system or the use of complicated control means.

According to the present invention, use is made of a container into which the polyphasic mixture is introduced and extraction means which extend over a certain non-zero depth in the container and have openings distributed over this depth.

Thus, a ratio T between the liquid throughflow section and the gas throughflow section corresponds to a given position of the liquid-gas interface.

A level change at the interface causes a change in the ratio T which tends to reestablish the equilibrium at a reference or equilibrium level. This produces self-regulation of the level and reduction of fluctuations in the composition of the polyphasic mixture delivered by the device according to the invention.

In the present invention, it must be understood that the term interface may designate an average surface separating a gas phase from a liquid phase. In fact, a zone may exist in polyphasic mixtures in a container where the distinction between the liquid phase and the gas phase is blurred, particularly due to the presence of foam.

Thus, the present invention relates to a device for regulating and reducing the fluctuations in composition of a polyphasic flow comprising at least a liquid phase and a gas phase. This device has a container for separation of the phases; the container has at least one inlet opening for the polyphasic mixture and means for extracting the contents of this container. The device is characterized by the extraction means including a tube extending into the container in order to traverse the liquid-gas interface in normal operation, and by the tube of the extraction means having extraction openings distributed on both sides of the interface in normal operation. The sum of the throughflow sections of the openings, estimated from a reference position on at least a portion of a vertical axis of the tube, varies as a function of the height, considered on said axis and for said portion, with said portion extending in normal operation on both sides of said interface. For example, near the bottom of the tube, the sum of the throughflow sections of the openings is small; whereas near the top of the tube, the sum of the throughflow sections of the openings is equal to the sum of the throughflow sections of all the openings located in the tube.

The extraction means may comprise at least one extraction tube and the extraction openings may be distributed on this tube.

The extraction tube may comprise at least one common outlet for the liquid phase and the gas phase.

The extraction tube may have at least two different outlets, one for extraction of a liquid-rich phase.

The extraction tube may have at least two different outlets, one of which extracts a gas-rich phase.

When average stable conditions of two-phase flow upstream of said device are considered, the throughflow section of all the openings that are in the gas phase above the level of the liquid-gas interface, and the throughflow section of all the openings in the liquid phase below said average level, may be in the ratio of the average volume flowrates of the liquid and gas phases.

The device according to the present application may comprise means for measuring the flowrates of the liquid and/or gas phases coming from the extraction tube.

The present invention also relates to application of the device described above to regulating the supply to a polyphasic pump.

In this application, the device may have auxiliary means usable temporarily, said means changing the quantity of liquid and/or gas extracted.

The device may have at least one auxiliary pipe for injecting a liquid phase and/or at least one auxiliary pipe for injecting a gas phase.

The present invention will be better understood and its advantages will emerge more clearly from the description hereinbelow of specific examples, which are not limiting, illustrated by the attached figures wherein:

FIG. 1 represents a first embodiment having extraction means with a single outlet, FIG. 2 shows a second embodiment for which the extraction means have two outlets, FIGS. 3 and 4 represent two alternative designs for the extraction holes, FIGS. 5, 6, and 7 illustrate different types of curves whereby the level N of the gas-liquid interface varies as a function of the ratio T between the liquid and gas throughflow sections, FIGS. 8, 9, and 10 relate to a three-compartment container taking production from two different sources, FIG. 11 shows the device according to the invention applied to operation of an offshore oil well, and FIG. 12 shows one arrangement of the devices according to the invention which allows pockets of gas that appear when the system starts up again, to be absorbed, particularly when the system is applied to production of two-phase petroleum fluid.

Reference 1 designates the tube through which a polyphasic mixture arrives at a transfer container 2. This container has an extraction tube 3. This tube has holes 4 distributed over its length. Tube 3 is connected to a tube 5 through which the polyphasic mixture exits to its destination. Reference 6 designates the gas-liquid interface.

In the case of oil production, tube 1 can be the production tube from one or more wells, particularly offshore wells, and outlet tube 5 may lead to the inlet of a polyphasic pump serving to carry the effluent to a processing site.

FIG. 2 represents another embodiment. The elements common to FIGS. 1 and 2 have the same references. Extraction tube 7 passes upward through the container and has two outlets, a bottom outlet 8 and a top outlet 9 connected respectively to a bottom conducting tube 10 and a top conducting tube 11. These two tubes meet at 12 and the resulting mixture is carried by tube 13. Conducting tubes 10 and 11 may contain measuring means for measuring the flow through each of these tubes. Such measurement may allow optimizing the operation of any downstream equipment processing the resulting mixture. Such equipment may be a two-phase pump whose rotational speed may be adjusted according to the above-mentioned flow measurements.

Bottom conducting tube 10 transfers an essentially liquid effluent while top conducting tube 11 transfers an essentially gaseous effluent. Flow-measuring means 14 and 15 passing respectively in bottom and top conducting tubes 10 and 11 do not need to be very accurate. The operation of the device according to the embodiments of FIGS. 1 and 2 is given below.

Container or two-phase regulator tank 2 has the purpose of reducing the variations in GOR that may be observed in intermittent two-phase flow (flow with liquid plugs and gas pockets), to convert flow with plugs into flow with bubbles (homogenous flow), [and] to have a sufficient liquid reserve to evacuate a large quantity of gas. GOR is the ratio between the volume of gas and the volume of liquid (gas-oil ratio).

The container is a piece of static equipment which allows a change in the GOR of the fluid at the inlet into a level change in the container, which level change may be a small one (in the case of a cylindrical container with a horizontal axis) or a large one (in the case of a cylindrical container with a vertical axis).

Moreover, the quantity of liquid held in the container may constitute a reserve usable to wet a large dry gas pocket (several cubic meters) and evacuate it with a GOR allowing a sufficient pressure gain to be achieved with a two-phase pumping system. This container may also serve to receive, in the case of a phase recycler being used, the liquid or gas phase extracted from the two-phase mixture at the outlet of the compression unit. In the case of a petroleum application, this container may also serve to separate part of the water container in the oil effluent and separate part of the sand contained in the oil effluent.

This container is equipped with a pierced tube through which the two-phase mixture can exit.

The two-phase fluid separated or partially separated in the container is evacuated by pierced tube 3 or 7 depending on whether the embodiment of FIG. 1 or 2 is considered, placed vertically in container 2. This tube allows the liquid to be evacuated proportionally to the level of interface 6 in the container, i.e. proportionally to the submerged throughflow section SL. Likewise, the gas is evacuated in proportion to the non-submerged throughflow section SG.

If Pi is the static pressure in the container at the level of an orifice i in the pierced tube and Ps is the fluid pressure at the outlet of the pierced tube, the outgoing liquid and gas flowrates are expressed by the relation:

$$Pi - Ps = f(Qi)$$

where Qi is the fluid flowrate through an orifice i.

The function f(Qi) takes into account the pressure loss through the orifice (or pressure gain given by the descending fluid—ejector effect), the linear pressure loss in the tube, and the pressure losses due to junctions (following orifices).

Although the analytical expression of function f(Qi) is not known, it may easily be imagined that the through-flow section (orifice section) necessary for evacuation of a volume of liquid must be larger than the through-flow section necessary to evacuate a volume of gas. Hence, the hole density at the lower part of the pierced tube will be greater than at the upper part of this tube (except where the GOR is very high or the pressure is high). The size of the outlet tube will preferably be such that the normal range of level variation is located in the middle of the container. This may be accomplished by experimentation.

Tests on the device according to the invention have shown that it is possible to absorb sudden changes in GOR that may occur at the outlet of a pipe and to deliver a two-phase flow whose density is practically constant and equal to the mean density of the fluid at the inlet to the container (average over time). Moreover, this container may constitute a reserve of liquid intended to evacuate, via the two-phase pump, a very large dry gas pocket (this gas pocket may appear during well startup phases).

FIG. 3 shows in more detail one embodiment of the extraction tube in which circular holes 16 are made. It will be seen that, in this embodiment, the hole density is greater in the vicinity 17 of the tube center zone. However, the center zone 18 itself has no holes in order not to affect the changes in GOR as long as the level of the gas-liquid interface has not shifted by a certain value.

FIG. 4 shows another embodiment of the extraction tube shown in more detail. The extraction openings are in the shape of triangles 19. Thus, it appears that the shape of the holes has little significance. What is important is the changes in T as a function of the average level of the interface in the container.

FIG. 5 consists of three graphs of the ratio T:

$$T = \frac{\text{liquid throughput section}}{\text{gas throughput section}}$$

as a function of the level N of the interface in the container. Curve 20 is a curve composed of three segments 21, 22, and 23. Segment 22 corresponds to a zone in which a change in the level of the interface does not produce a large change in the composition of the resulting mixture. After this zone, there is a change in the GOR of the mixture extracted which to some extent affects the changes in GOR at the inlet of the container. Curve 24 also has three zones 25, 26, and 27. Zone 26 corresponds to a function substantially similar to that of zone 22 of curve 20. The operation represented by curve 24 corresponds to rapid approach of the level of the interface to a specified level 28 since, once zone 26 has been shifted in one direction or the other, there is a rapid change in T which tends rapidly to eliminate surplus water or gas, whichever the case may be. Curve 29 corresponds to a relationship which favors starting of a well.

The pattern of perforations in the pierced tube is linked to the duration and amplitude of the perturbations at the inlet, the position of the average level giving the average desired output GOR, and the permissible change in output GOR. A sharp slope at the top 32 or bottom 32 of the tube allows gas or liquid to be "saved" in the container.

FIG. 6 shows the case of a graph with three regulation ranges 33, 34, and 35 with a slight effect on the changes in GOR at the inlet corresponding to three different GOR levels. Such a graph may be useful for example in the case where two different wells are being operated simultaneously. These ranges may be determined as a function of the characteristics of each well and the different operating regimes used. For example, range 33 may correspond to regulation when only well 1 is producing, range 35 when only well 2 is producing, and range 34 when both wells 1 and 2 are producing simultaneously.

FIG. 7 shows schematically the influence of the slope of the change in T=SL/SG as a function of level.

$$\text{slope} = \frac{d\,(\text{level})}{d\frac{SL}{SG}}$$

When the slope tends to infinity, as is the case with slope 36, the changes in level have no effect on the outlet GOR. When the slope is positive and equal to a finite value, as in the case of slope 37, the changes in level result in a change in outlet GOR. For a given change in level, the gentler the slope the greater the change in outlet GOR. A zero slope, in case 38, corresponds to overflow.

When the container is horizontal and has a circular cross section and if the average level is in the middle of the container, a perturbation in GOR at the container inlet will lead to a slight change in level and hence to a slight change in outlet GOR (for given perforations). The level changes less rapidly at the longest "width" than at the top or the bottom of the container.

FIG. 8 shows a container 39 having two partitions 40 and 41 which divide the container into three compartments 42, 43, and 44. Center compartment 44 communicates with partitions 40 and 41 by means of holes. Compartment 42 receives, at 45, the output from a first two-phase effluent source such as a first well and compartment 43 receives at 46 the output from a second two-phase effluent source such as a second well.

Reference 47 designates a pipe for equalizing the pressures in compartments 42 and 43. Arrows 48 and 49 correspond to upper and lower conducting pipes connected to the extraction means.

FIG. 9 shows an embodiment of partition 40 which has circular holes 50.

FIG. 10 shows an embodiment of partition 41 which has holes 51 that are essentially K-shaped.

Figure 5:
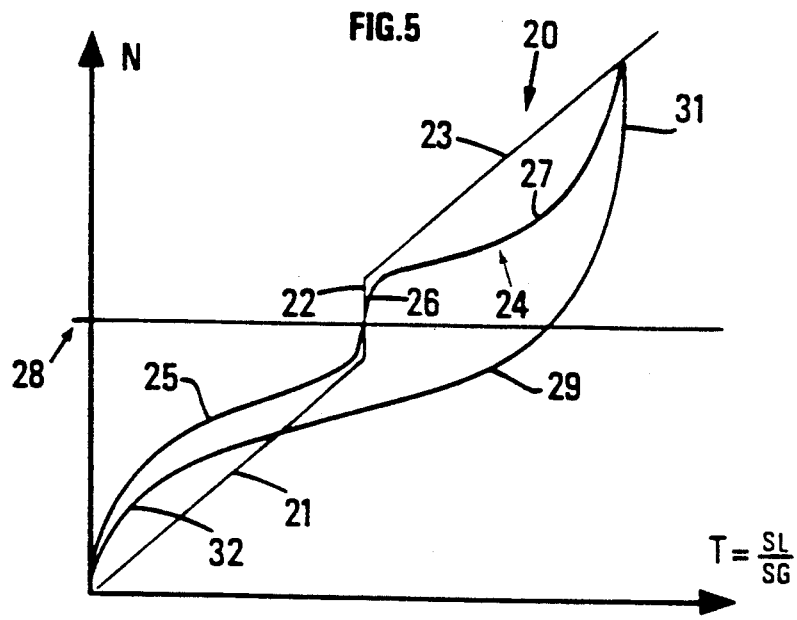
Figure 6:
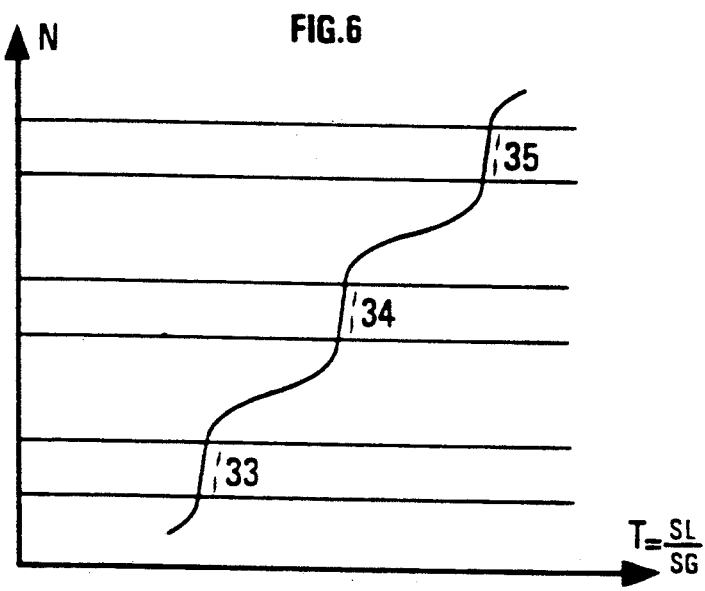
Figure 7:
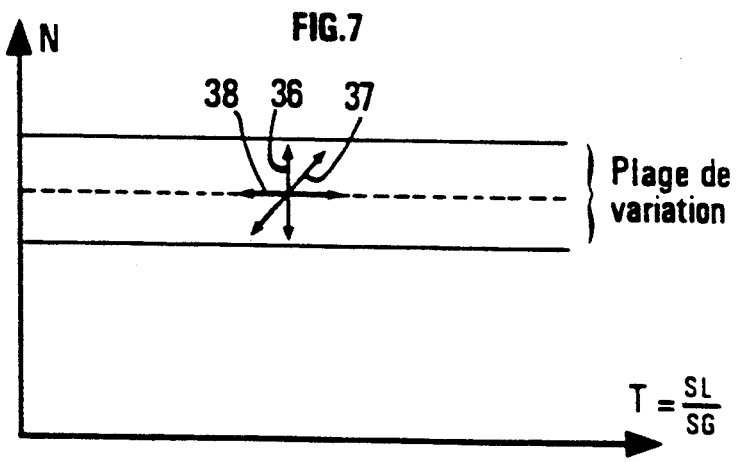
Figure 11:
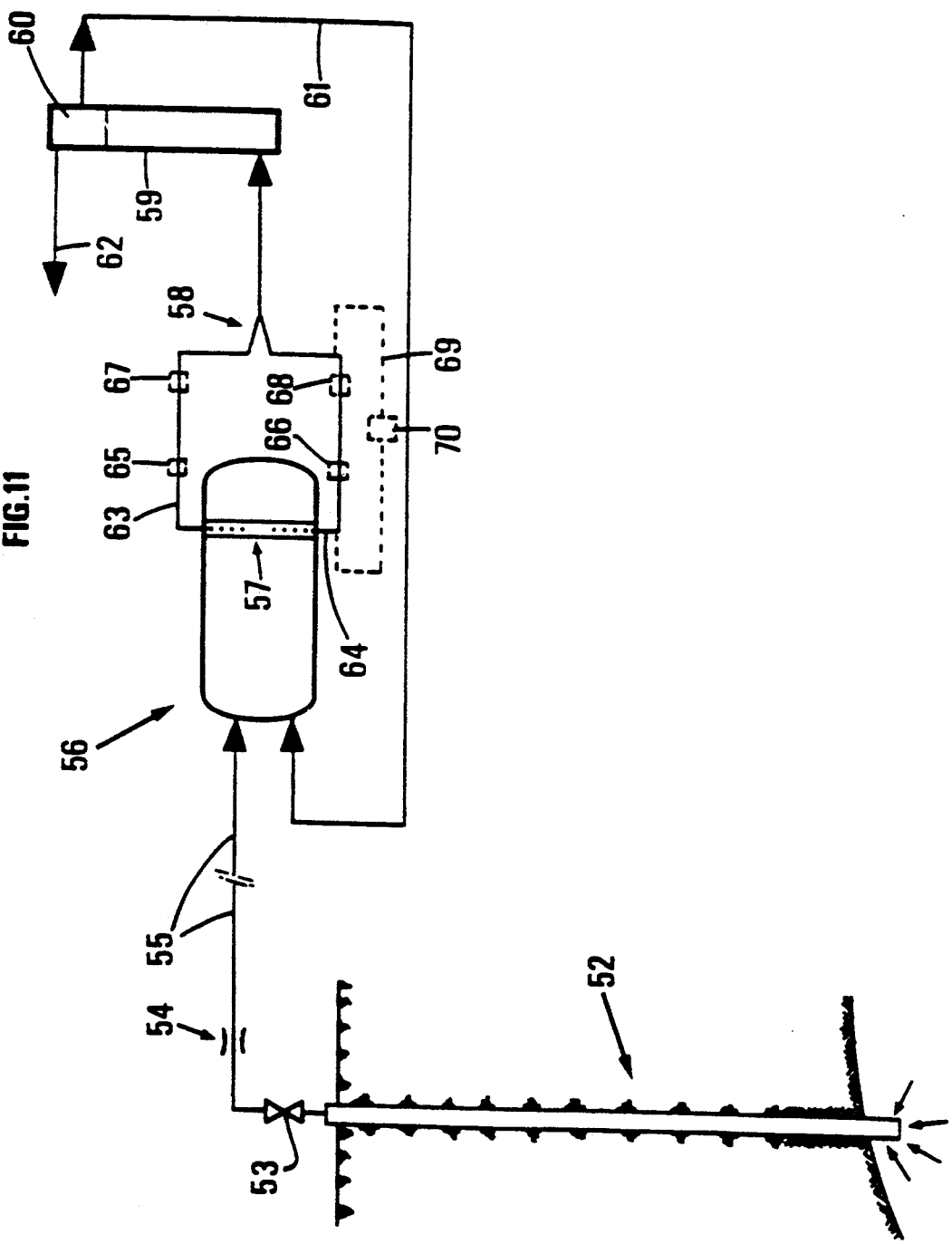

FIG. 11 shows the device according to the invention applied to production of a two-phase oil effluent produced by an offshore well 52 equipped with a wellhead 53, a flow-adjusting beam 54, and evacuation line 55 supplying container 56 according to the present invention having extraction means 57 with two outlets that meet at 58 to supply two-phase pumping unit 59. The pumped effluent may be processed in a separator 60 that recycles part of the liquid phase into container 56 via recycling line 61.

Reference 62 designates the production transfer pipeline. Top outlet 63 and bottom outlet 64 of container 56 may be equipped with flow-measuring means 65 and 66 respectively and remote-controlled on/off valves 67 and 68 controlling the operation of the system. Also, the device may have an auxiliary line 69 for extracting the essentially liquid phase, this line having an on/off valve 70. This line will advantageously be used to fill container 56 with liquid before production stops. This liquid reserve will allow the system to be easily restarted. This result is obtained by shutting valve 68 and opening valve 70 before production stops. Valve 70 in conjunction with auxiliary line 69 has a calibrated pressure loss allowing pump 59 to operate with a minimum quantity of liquid. Thus, during this operating phase, the liquid level rises in container 56.

Figure 12:
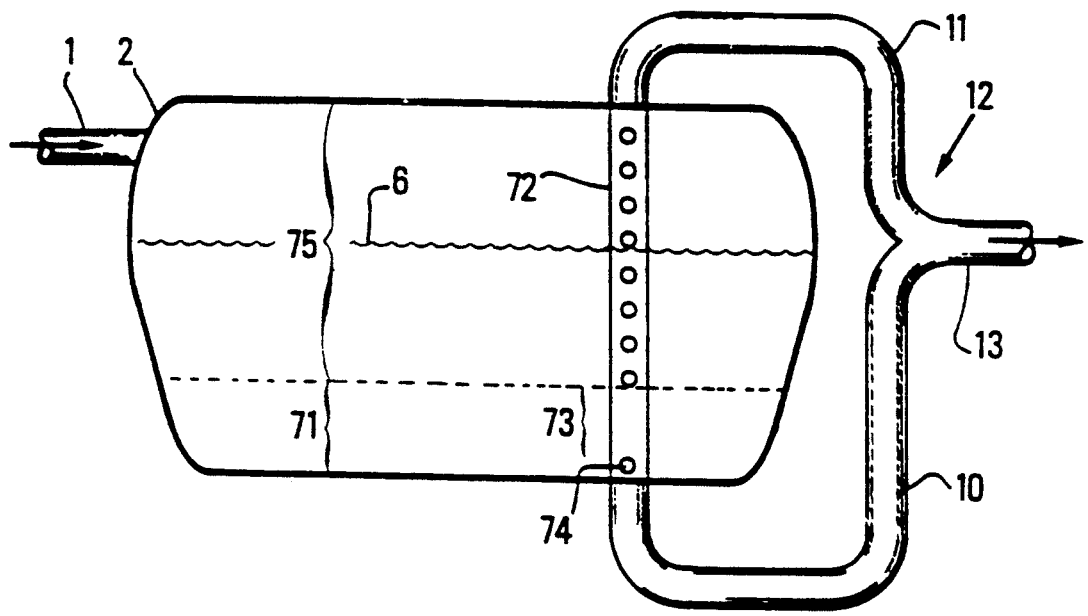

FIG. 12 illustrates a simpler variant than that of FIG. 11 for allowing the system to be re-started after a shutdown. Re-starting the system after a shutdown poses the problem that, during the shutdown, the well and production lines fill with gas. Thus, when production is re-started, a gas pocket with a large volume, for example about 20 to 25 cubic meters, must be processed.

To solve this problem, it is proposed that the container have at its lower part an additional reserve volume 71.

The portion of the length 73 of tube 72 pierced with orifices passing through this additional reserve has no hole other than a hole 74 at its lower part.

Additional reserve volume 71 and the calibration of hole 74 are designed to process the volume of the gas pocket occurring on re-starting, namely allowing production of the mixture resulting in tube or pipe 13, having characteristics, in particular a GOR, that allow processing by pumping equipment.

In normal operation, because of the characteristics of the polyphasic mixture source arriving via tube 1 and because of the size of pierced tube 72, the gas-liquid interface is in zone 75.

Thus, when the system is shut down, the additional reserve volume 71 filled with liquid is ensured as a minimum.

This volume is sufficient to allow the gas pocket occurring on startup to be wetted and a polyphasic two-phase mixture to be obtained in tube 13 that has a sufficient GOR to be processed by the pumping equipment.

FIG. 12 is derived from FIG. 2 and the elements common to both have the same reference numbers.

The variant described in relation to FIG. 12 may also be applied to the device of FIG. 1.

The various devices according to the present invention are particularly well suited to production of polyphasic oil effluent, particularly offshore.

Indeed, the container equipped with a tube according to the invention may be located on the ocean floor to extract the two-phase oil effluents coming from offshore wells.

The associated pumping equipment may advantageously be a pump of the axial-flow type.

We claim:

1. A device for regulating and reducing the fluctuations in composition of a polyphasic flow having at least a liquid phase and a gas phase, said device comprising a container for separation of said phases which form a liquid-gas interface within said container, said container having at least one inlet opening for the polyphasic mixture and means for extracting the contents of said container, characterized by said extraction means including a portion extending vertically in said container to traverse the liquid-gas interface in normal operation, and by said extraction means having extraction openings distributed on both sides of said interface in normal operation for extracting liquid and gas phases from said container; density and distribution of said openings being determined to attenuate the fluctuations of the polyphasic flow if the level of the liquid-gas interface is displaced a certain value from an equilibrium level of the liquid-gas interface situated in a predetermined zone of the vertically extending portion of the extraction means.

2. A device according to claim 1 characterized by said portion of said extraction means comprising at least one vertical extraction tube and by the extraction openings being distributed over a wall along the vertical axis of said tube.

3. A device according to claim 2 characterized by said extraction tube having at least one common outlet for the liquid phase and the gas phase.

4. A device according to claim 2 characterized by said extraction tube having at least two different outlets one of which extracts a liquid-rich phase.

5. A device according to claim 2 characterized by said extraction tube having at least two different outlets one of which extracts a gas-rich phase.

6. A device according to claim 1 characterized in that, for average stable two-phase flow conditions upstream of said device, the throughflow section of all the holes in the gas phase above the gas-phase interface, and the throughflow section of all the holes in the liquid phase below the liquid-gas interface, are in the same ratio as the average volume flow rates of the liquid and gas phases.

7. A device according to claim 6 characterized by comprising means for measuring the flows of the liquid and/or gas phases coming from said extraction tube.

8. A device according to claim 1 characterized by said container having at its lower part an additional reserve volume, by said extraction means passing through said additional reserve volume, and by said extraction means not having, in the portion of their length passing through said reserve volume, an extraction opening except for the opening at the lower part of said additional reserve volume.

9. A method of using the device described in claim 1 which comprises transferring the extracted contents of the container via said extraction means to regulate a supply of polyphasic flow to a polyphasic pump.

10. A method according to claim 9 characterized by said device having auxiliary means for controlling said polyphasic flow usable temporarily, said auxiliary means changing the quantity of gas or the quantity of gas extracted.

11. A method according to claim 9 characterized by said device having at least one auxiliary pipe injecting a liquid phase and/or at least one auxiliary pipe injecting a gas phase into said container.

12. A method for using the device described in claim 1 wherein said device is employed to effect production of a two-phase oil effluent.

13. A method according to claim 12 wherein said device is associated with axial-flow pumping equipment.

14. A method according to claim 13 wherein said device is connected to offshore oil wells, said device being substantially submerged at the bottom of the ocean.

15. A device according to claim 1, wherein said predetermined zone of the vertically extended portion of the extraction means has no openings.

16. A device according to claim 15, wherein the predetermined zone is located in a center zone of the vertically extending portion of the extraction means.

* * * * *